United States Patent
Li

(10) Patent No.: US 10,353,951 B1
(45) Date of Patent: Jul. 16, 2019

(54) SEARCH QUERY REFINEMENT BASED ON USER IMAGE SELECTIONS

(71) Applicant: SHUTTERSTOCK, INC., New York, NY (US)

(72) Inventor: Grace Mulan Li, Jersey City, NJ (US)

(73) Assignee: SUTTERSTOCK, INC., New York, NY (US)

( * ) Notice: Subject to any disclaimer, the term of this patent is extended or adjusted under 35 U.S.C. 154(b) by 77 days.

(21) Appl. No.: 15/706,300

(22) Filed: Sep. 15, 2017

(51) Int. Cl.
*G06F 16/58* (2019.01)
*G06N 3/04* (2006.01)
*G06F 16/432* (2019.01)
*G06F 16/435* (2019.01)

(52) U.S. Cl.
CPC ........ *G06F 16/5866* (2019.01); *G06F 16/434* (2019.01); *G06F 16/435* (2019.01); *G06N 3/04* (2013.01)

(58) Field of Classification Search
None
See application file for complete search history.

(56) References Cited

U.S. PATENT DOCUMENTS

| 6,463,426 B1 * | 10/2002 | Lipson | G06K 9/6206 |
| 2002/0168117 A1 * | 11/2002 | Lee | G06F 16/58 |
| | | | 382/305 |

* cited by examiner

*Primary Examiner* — Mark Roz
(74) *Attorney, Agent, or Firm* — McDermott Will & Emery LLP

(57) ABSTRACT

A method is provided for receiving from a user a first search query for media files from a collection of media files. The method includes providing, in response to the first search query, a first search result to the user, the first search result including responsive media files associated with the first search query, detecting a user selection of a responsive media file based on an interaction between the user and the responsive media file and selecting multiple similar media files having a visual similarity with the responsive media file. The method also includes generating a refined query based on a caption associated with a refined cluster of media files, the refined cluster of media files being proximal to the similar media file, and displaying, to the user and based on the refined query, a refined search result comprising refined media files from the refined query.

18 Claims, 8 Drawing Sheets

SEARCH QUERY REFINEMENT BASED ON USER IMAGE SELECTIONS

BACKGROUND

Field

The present disclosure generally relates to a computer-based search engine, and more particularly to methods and systems to refine a search query in the search engine based on user image selection.

Description of the Related Art

In the context of large multimedia databases, the ability of search engines to rapidly obtain relevant results for a user can be hampered by large computational overheads. Users may have a very clear idea of the type of images that they are looking for, but lack the language skills or the immediate knowledge of the precise words for a search query that may desirably produce an accurate search result. Users become frustrated by inaccurate search results that can force users to browse through many pages of results without selecting any of the displayed results, consequently reducing the advantage of an otherwise rich multimedia database.

SUMMARY

According to one embodiment of the present disclosure, a computer-implemented method is provided. The computer-implemented method includes receiving from a user a first search query for visual media files from a collection of visual media files, and providing, in response to the first search query, a first search result to the user, the first search result including responsive visual media files associated with the first search query. The computer-implemented method also includes detecting a user selection of a responsive visual media file based on an interaction between the user and the responsive visual media file, and selecting multiple similar visual media files having a visual similarity with the responsive visual media file. The computer-implemented method also includes generating a refined query based on a caption associated with a refined cluster of visual media files, the refined cluster of visual media files being proximal to the similar visual media file, and displaying, to the user and based on the refined query, a refined search result comprising refined visual media files from the refined query.

According to one embodiment, a system includes one or more processors and a computer-readable storage medium coupled to the one or more processors. The computer-readable storage medium includes instructions that, when executed by the one or more processors, cause the one or more processors to receive from a user a first search query for visual media files from a collection of visual media files, to provide, in response to the first search query, a first search result to the user, the first search result including responsive visual media files associated with the first search query, and to detect a user selection of a responsive visual media file based on an interaction between the user and the responsive visual media file. The one or more processors also execute instructions to select multiple similar visual media files having a visual similarity with the responsive visual media file, to generate a refined query based on a caption associated with a refined cluster of visual media files, the refined cluster of visual media files being proximal to the similar visual media file, and to display, to the user and based on the refined query, a refined search result comprising refined visual media files from the refined query.

According to another embodiment, a non-transitory, machine-readable storage medium is described that includes machine-readable instructions for causing a processor to execute a method. In some embodiments, the method includes receiving from a user a first search query for visual media files from a collection of visual media files, and providing, in response to the first search query, a first search result to the user, the first search result including responsive visual media files associated with the first search query. The method also includes detecting a user selection of a responsive visual media file based on an interaction between the user and the responsive visual media file, and selecting multiple similar visual media files having a visual similarity with the responsive visual media file. The method also includes generating a refined query based on a caption associated with a refined cluster of visual media files, the refined cluster of visual media files being proximal to the similar visual media file, and displaying, to the user and based on the refined query, a refined search result comprising refined visual media files from the refined query.

Further, in some embodiments, a system is described that includes a means for storing computer code. The system also includes a means for executing the computer code and cause the system to perform operations. The means for executing the computer code is configured to receive from a user a first search query for visual media files from a collection of visual media files, to provide, in response to the first search query, a first search result to the user, the first search result including responsive visual media files associated with the first search query, and to detect a user selection of a responsive visual media file based on an interaction between the user and the responsive visual media file. The means for executing the computer code also executes instructions to select multiple similar visual media files having a visual similarity with the responsive visual media file, to generate a refined query based on a caption associated with a refined cluster of visual media files, the refined cluster of visual media files being proximal to the similar visual media file, and to display, to the user and based on the refined query, a refined search result comprising refined visual media files from the refined query.

According to one embodiment of the present disclosure, a computer-implemented method is provided for providing a first query via an application on a client device, the first query including a text string, selecting an image from a results panel displayed on a user interface in a display of the client device, in response to the first query, providing a second query via the application on a client device, the second query selected and modified from a refined query provided on the display of the client device, and selecting an image from a results panel displayed on the display of the client device in response to the second query.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments, and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
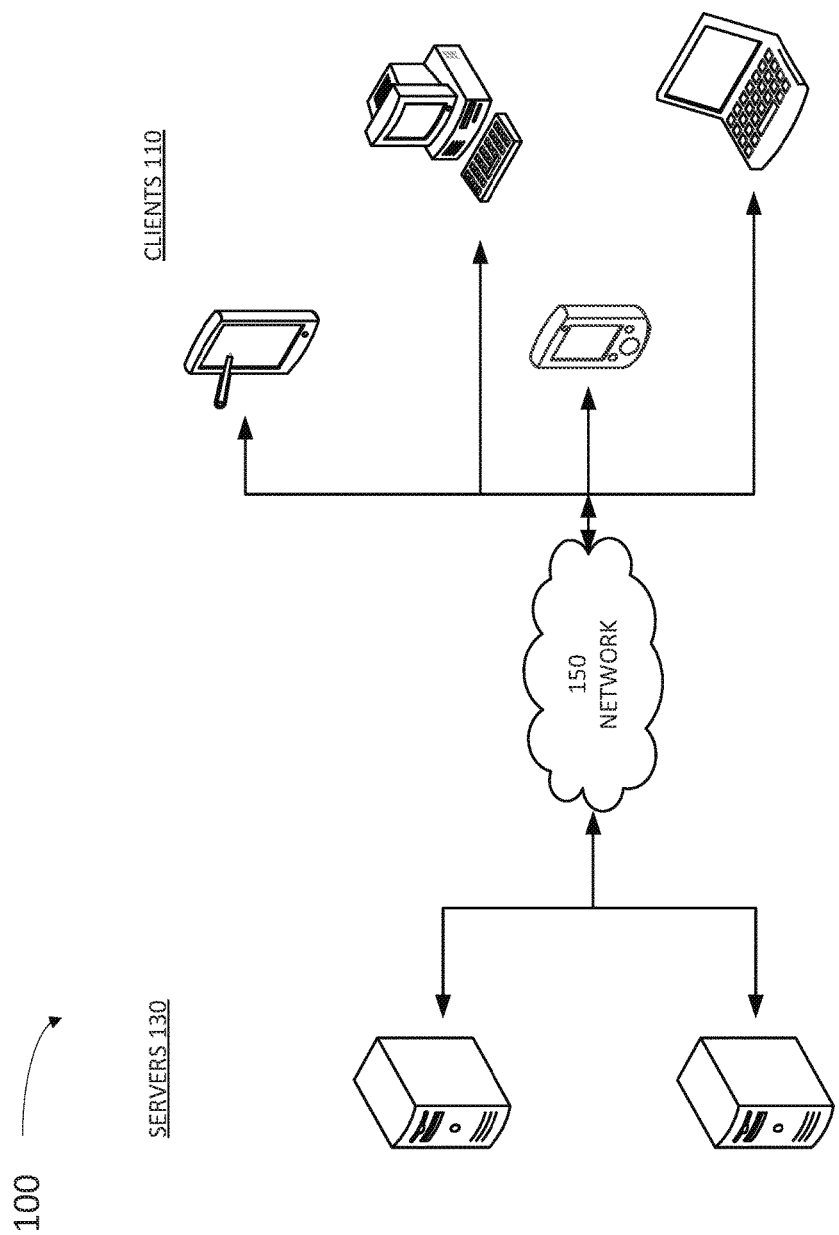
FIG. 1 illustrates an example architecture of a search engine suitable for practicing some implementations of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

As used herein, the term "content item" may be, for example, in reference to a digital document that is composed of one or more media elements of different types (text, image, video, audio, etc.). A content item can be a single picture or a single video clip. The term "image identifier" as used herein may refer to a form of metadata such as a tag and/or a label associated with an image for identifying the image or video clip.

General Overview

The disclosed system addresses the problem of filtering results in a search engine in a large database of content items, which is a problem specifically arising in the realm of computer technology. The problem is addressed by providing a solution also rooted in computer technology, namely by considering the refinement of an initial user query for a search engine and focusing the search scope using the refinement, which results in a more exhaustive and effective search with little to no computational overhead and a higher likelihood of user satisfaction.

The subject system provides several advantages, including providing a refined and more efficient search scope for queries to a search engine. Thus, in embodiments as disclosed herein, the search experience for a user is faster and simpler, enticing user to prefer websites as disclosed herein over other websites and download more pictures from the website, thereby increasing revenue and market visibility. The system provides for machine learning capability where the system can learn from a content item such as prior search queries from one or multiple users to better focus a search scope, thereby increasing the likelihood that the user will in fact select at least one or more results. Also, the system enables the user to more rapidly and efficiently interact with a search engine, improving user experience and satisfaction.

Embodiments as disclosed herein advantageously add limited computational overhead by including a plurality of similar images to selected images from the search results for a first user provided query. In addition to performing a refined and likely more accurate search, the proposed solution further provides improvements to the functioning of the computer itself because it substantially reduces network usage (e.g., during an image search) while providing search results that are more likely to be relevant to the user.

Although many examples provided herein describe a user's search inputs being identifiable, or download history for authentic or non-authentic images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

FIG. 1 illustrates an example architecture of a search engine suitable for practicing some implementations of the disclosure. Architecture 100 includes servers 130 and clients 110 connected over a network 150. One of servers 130 is configured to host a computer-operated neural network. The neural network (NN), which can be a convolutional neural network (CNN), is trained to identify features of images corresponding to one or more image identifiers. One of the many servers 130 also hosts a collection of images, video clips, and multimedia files. For purposes of load balancing, multiple servers 130 can host the neural network and multiple servers 130 can host the collection of images.

Servers 130 can be any device having an appropriate processor, memory, and communications capability for hosting the neural network, the collection of images, and the search engine. The search engine is accessible by various clients 110 over network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the search engine on one of the servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example

Figure 2:
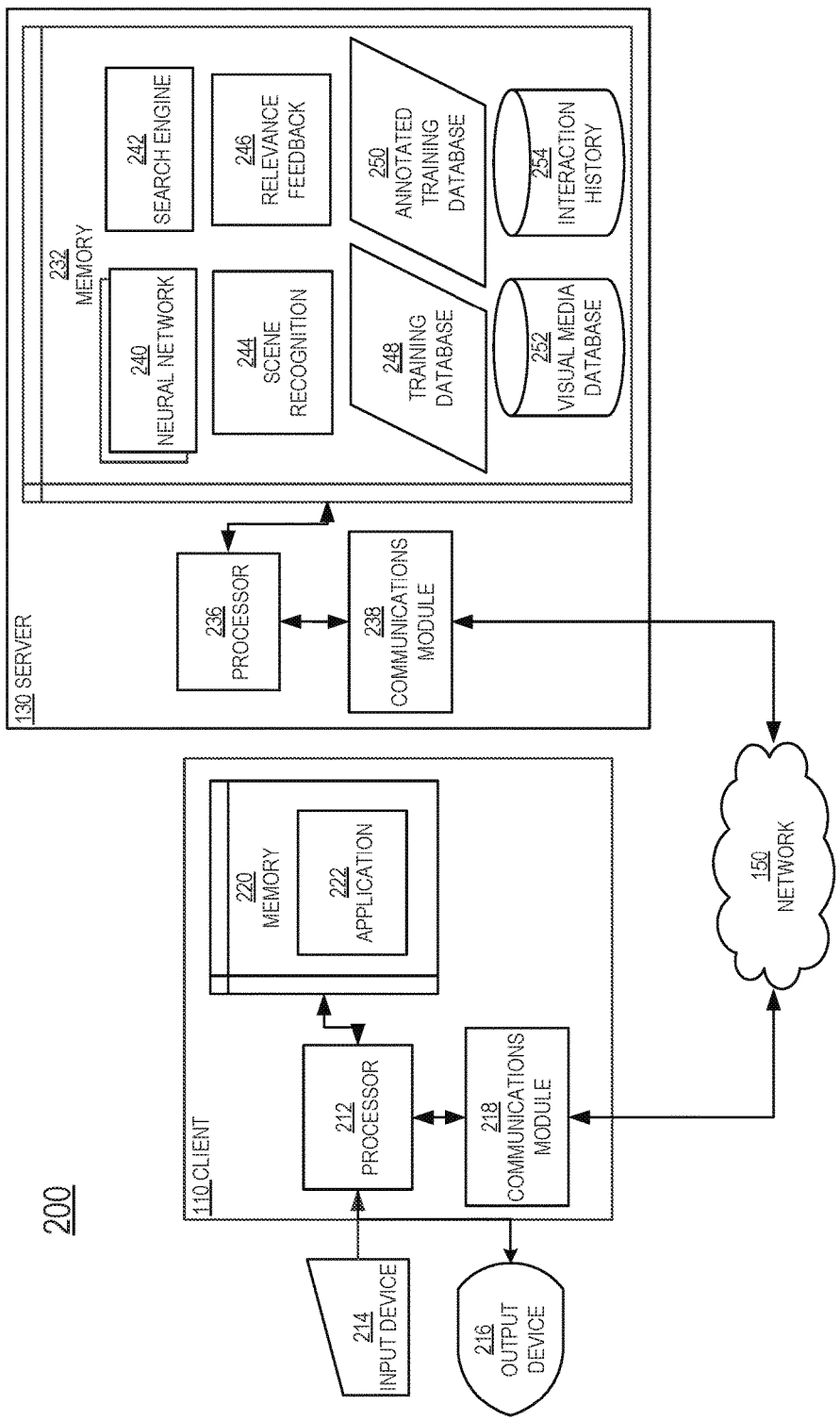
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. Client 110 and server 130 are connected over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and communications module 238. In some embodiments, memory 232 includes a NN 240. Further, in some embodiments NN 240 has access to a multi-dimensional image vector space to provide images from a visual media database 252, as a result of a refined user query. In some embodiments, NN 240 may include a feed-forward artificial neural network where individual neurons are tiled in such a way that individual neurons (or 'nodes') respond to overlapping regions in a visual field. The architecture of NN 240 may be in the style of existing well-known image classification architectures such as AlexNet, Google Net, or Visual Geometry Group models (e.g., VGG networks). In certain aspects, NN 240 includes a stack of layers followed by at least one fully connected layer. NN 240 can include a loss layer (e.g., softmax, L2 loss, or sigmoid cross-entropy loss layer) to back propagate errors so that NN 240 learns and adjusts its weights to better fit a desired outcome, including provided image data (e.g., the selection of a specific frame in a sequence of frames, or an object, or a specific scene in a video clip). Moreover, NN 240 may include at least one layer that performs computations such as data convolution and subsampling on an image frame to obtain a plurality of values for image classifiers, wherein the plurality of values may form the coordinates of an image vector in a multi-dimensional vector space.

Memory 232 also includes a visual media database 252 and a search engine 242 for searching database 252. In one or more implementations, visual media database 252 represents a database that contains a plurality of visual media files (e.g., images, video clips and the like). Also included in memory 232 of server 130 is a training database 248. Training database 248 can be, for example, a dataset of content items (e.g., visual media files) corresponding to any one of abstract images, sport images, outdoor images, pet images, scenes containing logo images, scenes containing icon images, scenes containing texture images, scenes containing Instagram images, scenes containing illustration images, scenes containing background images, scenes containing stock people images, scenes containing high dynamic range (HDR) images, scenes containing collection images, scenes containing macro images, scenes containing candid people images, scenes containing vector images, scenes containing pattern images, and the like.

Training database 248 may include multiple instances (or sets) of training data, where each instance (or set) of training data is associated with a particular style class. In some embodiments, training database 248 includes a label indicating the style class strength (e.g., very candid, somewhat candid, not candid, very "cute," very "hideous," and the like) as well as the visual media files. Training database 248 also may include visual media vector information and image cluster information. The visual media vector information identifies training vectors representing a large sample of training visual media files, and annotated training database 250 includes respective semantic concepts for each visual media file in training database 248 (e.g., image or video caption and search queries). In this respect, the vectors corresponding to a semantic concept (e.g., 'beach') may be clustered into one cluster representing that semantic concept. Moreover, the cluster may include at least one visual media file stored in visual media database 252. In one or more implementations, training database 248 may be populated with public domain images from third-party image sharing websites.

Training vectors for each of the visual media files may be clustered into a number of clusters according to a clustering algorithm, for example, using k-means clustering. For example, the training vectors for video clips in database visual media database 252 can be assigned to clusters by the clustering algorithm based on a similarity threshold. The number of clusters can be manually selected, for example, so that visual media database 252 be divided into one-thousand (1000) clusters. Training vectors for image files in visual media database 252 are associated with one of the clusters based on a similarity threshold using the clustering algorithm. The similarity threshold can indicate visual similarity, conceptual similarity, keyword similarity, or another measurement of similarity between the visual media files. Other clustering algorithms may be used, including methods of vector quantization, or other clustering approaches such as affinity propagation clustering, agglomerative clustering, Birch clustering, density-based spatial clustering of applications with noise (DBSCAN), feature agglomeration, mini-batch k-means clustering, mean shift clustering using a flat kernel, or spectral clustering, among others.

In certain aspects, visual media database 252 stores the training vectors (e.g., a 256 dimensional vector) for each visual media file in database 252. Each visual media file in visual media database 252 is mapped to its corresponding set of training vectors using a unique index value for the visual media file that is listed in an index. The training vectors for a visual media file capture the visual nature of the corresponding media file (e.g., of a corresponding image). The training vector is such that given a pair of training vectors for a corresponding pair of visual media files, similarity calculations between the pair of training vectors (e.g., a cosine similarity algorithm) can meaningfully capture a visual similarity between the corresponding pair of visual media files. In certain aspects, training vectors may be normalized (e.g., to be the same scale) to expedite a later processing.

NN 240 can be used to train a model to generate training vectors for visual media files, such as for images or videos, and map each visual media file to its corresponding training vectors in a 'dense' vector space, wherein density is associated with the number of training vectors in a unit volume of the vector space. A distance in the vector space can be calculated between points associated with the training vectors.

Memory 232 also includes an annotated training database 250. Annotated training database 250 may be targeted data gathered via third-party crowd-sourcing platforms (e.g., MTurk, CrowdFlower, etc.). Annotated training database 250 may include visual media files from visual media database 252 that are human annotated with information indicating a caption, a keyword, or a text descriptor associated with the visual media file. For example, in some embodiments, a textual descriptor for an image in annotated database 250 may include a 'style' content or a 'subject matter' content. Accordingly, search engine 242 may search for images in database 252 based on a query input by the user. Thus, search engine 242 may perform a textual match for the input query with the captions, keywords, and textual descriptors in annotated training database 250. Annotated training database 250 may be utilized to further refine the training of CNN 240.

Although training database 248 is illustrated as being separate from visual media database 252, in certain aspects training database 248 is a subset of visual media database 252. Furthermore, although database 252 and search engine 242 are illustrated as being part of memory 232, in certain aspects visual media database 252 and the search engine 242 can be hosted in the memory of a second server that is accessible by the server 130 illustrated in FIG. 2.

Memory 232 also includes a relevance feedback database 246. In some aspects, processor 236, using relevance feedback database 246, can tag each of the images in visual media database 252 with metadata identifying an index to a corresponding score in relevance feedback database 246 and an index to a style class in a scene recognition database 244. The tagging can serve as an indication of an association between a corresponding authenticity score and one or more style classes. The metadata may be a metadata file stored as a flat document or an index identifying a storage location in visual media database 252. For example, the metadata file may include one or more rows of data including an image identifier, a video URL, and a style identifier (e.g., identifying the corresponding style class).

Memory 232 also includes an interaction history database 254. In certain aspects, processor 236 is configured to modify interaction history database 254 by obtaining user interaction data identifying interactions with images from image search results that are responsive to search queries. In this respect, the search results may be personalized based on the authenticity level of the most-recent images downloaded or clicked by the user. For example, processor 236 may determine that a user interacted with an image from a search result, such as by clicking on the visual media file, saving the image for subsequent access, downloading the visual media file to a client (e.g., client 110), or the like. Processor 236 may keep track of the user interactions with a number of visual media files over a given time period. The interaction history 254 may also include data indicating search behavior (and/or patterns) relating to prior search queries.

Processor 236 is configured to execute instructions, such as instructions physically coded into processor 236, instructions received from software in memory 232, or a combination of both. For example, processor 236 of server 130 executes instructions to submit a plurality of training images containing content identifying different semantic concepts (e.g., woman, coffee, beach, soccer) to NN 240 that is configured to analyze pixel data collected from different frames in a time sequence from a scene for each of the plurality of training visual media files to identify selected features. The selected features may correspond to a particular semantic concept. Processor 236 may receive, from NN 240 and for each of the plurality of training visual media files, an identification of one or more style classes corresponding to the visual media file processed by NN 240.

In certain aspects, processor 236 is configured to receive a user input from a user. The user input identifies a search query in a given natural language. For example, the search query may be entered as an English term. A user of client 110 may use input device 214 to submit a search query via a user interface of application 222. The search query may be a word, a phrase, or an expression. The user interface may, for example, include an input section where the search term or phrase may be typed in. The input section may include one or more controls to allow the user to initiate the visual media file search upon receiving the search query. In some aspects, the visual media file search may be initiated automatically upon receiving at least one search term (or at least the search phrase in part). As described herein, the natural language used is not limited to English, and the number of natural languages can vary to include other natural languages depending on implementation.

The search query is provisioned to search engine 242 for initiating a search through image database 252. The user input is provided, for example, by the user accessing the search engine 242 over network 150 using application 222 in memory 220 on client 110, and the user submitting the user input with input device 214. For example, the user may use input device 214 to enter a text-based search term or phrase. In response to the user input via application 222, processor 212 is configured to transmit the search query over network 150 using communications module 218 to communications module 238.

Processor 236, upon receiving the search query for search engine 242, submits a search request for the search query to search engine 242. Processor 236 then receives an identification of a plurality of images, with varying levels of relevance (e.g., using relevance feedback database 246) from visual media database 252 that are responsive to the search query, and is configured to provide a listing of images with a ranking (or prioritization) according to a relevance search probability (e.g., using interaction history database 254). The listing of visual media files that is prioritized (or ranked) according to the user interaction probabilities is provided, for example, by processor 236 as a set of training visual media files (e.g., training database 248 and annotated training database 250) to NN 240 prior to the search query being received. Processor 236, using a logistic regression model, identifies the level of relevance for each of the visual media files in visual media database 252. Processor 236 may further provide the listing of visual media files to application 222 over network 150 for display by output device 216. In some embodiments, the output device may be a display controlled by a graphics user interface (GUI). In some embodiments, input device 214 and output device 216 may be combined in a touch-screen display controlled by a GUI configured to receive a user input and provide an output (e.g., a graphic, a web shot, and the like).

Figure 3:
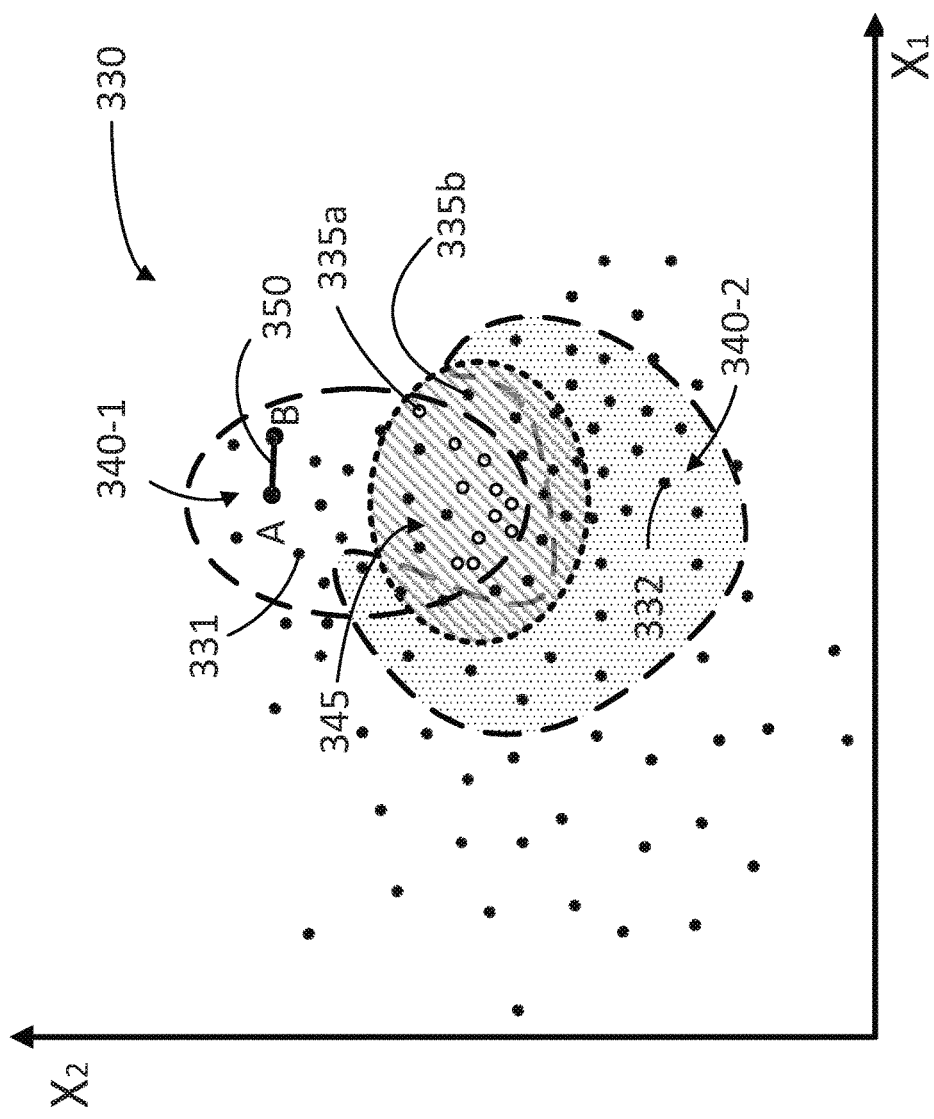
FIG. 3 illustrates a chart of a multi-dimensional image vector space accessible by a search engine to refine a query for image search, according to some embodiments.

FIG. 3 illustrates a chart of a multi-dimensional space 330 accessible by search engine 242 to refine a query for visual media search based on user selection of the visual media files. In some embodiments, multi-dimensional space 330 is formed by NN 240 using relevance feedback database 246, training database 248, annotated training database 250, visual media database 252, and interaction history database 254. Further, multi-dimensional space 330 may be stored in memory 232, or may be external to memory 232 and directly or remotely accessible to search engine 242. Multi-dimensional space 330 may include a visual media file vector space having visual media file vectors 331, 335a, 335b (hereinafter collectively referred to as "vectors 335"), and 332. Vectors 331, 332 and 335 have an abscissa $X_1$ and an ordinate $X_2$, selected according to NN 240. Moreover, each of vectors 331, 332 and 335 may be associated to a caption, a keyword, or some other text descriptor (e.g., through annotated training database 250). In some embodiments, NN 240 is configured so that vectors 331 and 332, associated with visual media files having similar or common text descriptors are located, or "clustered," in close proximity to each other in multi-dimensional space 330, wherein a distance, D 350, between any two of vectors 331, 332 or 335 ('A,' and 'B') may be defined as a "cosine" distance, D. In some embodiments, and without limitation, a cosine distance between two vectors, A, and B, regardless of the dimensions of the vectors, may be obtained from the mathematical expression $$D = 1 - \frac{A \cdot B}{|A||B|}, \qquad (1)$$

where the "dot" product "·" may be suitably defined for the vector space that includes vectors A and B, and |A| and |β|, are generally "lengths" associated to vectors A and B, respectively, in the vector space.

Multi-dimensional space 330 is dense, including clusters 340-1 and 340-2 (hereinafter, collectively referred to as "clusters 340"), of closely related vectors 331 and 332, respectively. Each cluster 340 may be associated with visual media files belonging in a class of visual media files for a common, or similar text descriptor (e.g., caption, or keyword). Further, each cluster 340 may be associated with a conceptual representation of the visual media files in the cluster (e.g., based on a caption or keyword associated with the visual media file in annotated training database 250). Accordingly, multi-dimensional space 330 may be separated in two or many more clusters 340, each cluster 340 grouping together visual media files expressing a coherent idea, as expressed in a keyword, caption, or text descriptor. More specifically, cluster 340-1 may be formed such that D 350 between any two of vectors 331 is less than a pre-selected threshold. Accordingly, cluster 340-1 may be a group of vectors 331 having similar, or overlapping to some extent, caption or keyword descriptors (e.g., "cute cat," "household cat," and the like). Likewise, cluster 340-2 may be formed such that D 350 between any two of vectors 332 is less than the pre-selected threshold. Accordingly, cluster 340-2 may be a group of vectors 332 having similar, or overlapping to some extent, caption or keyword descriptors (e.g., "nebelung cat"). Moreover, in some embodiments cluster 340-1 and 340-2 may have an overlapping set of vectors (e.g., "nebelung" cats that are "cute" or belong in a "household").

Given a first query provided by a user (e.g., "cute cat"), a results panel in the display of client device 110 may include at least some image vectors 331 from cluster 340-1. In some embodiments, the user may actually desire to look for "nebelung cats," but the term may be unknown to the user (albeit multi-dimensional space 330 has cluster 340-2 associated with the term "nebelung cats," based on prior interaction history). Regardless, the results panel, which includes vectors from cluster 340-1, may include some vectors 335a, which lie somewhat closer to cluster 340-2 ("nebelung cats"). Since the user is really looking for "nebelung cats" (although the first query was imprecise), the user will likely select vectors 335a from the first results panel (e.g., by interacting with, or downloading, the corresponding visual media files). The system then forms a similar visual media file set 345 including vectors 335a, and vectors 335b that are proximal to vectors 335a, based on a close distance D 350 (e.g., "visual similarity"). In some embodiments similar visual media file set 345 may be a separate cluster determined beforehand by the system in multi-dimensional space 330. In some embodiments, similar visual media file set 345 may include vectors 335 from multiple different clusters, including any one of clusters 340 and other clusters defined in multi-dimensional space 330.

The system selects a refined cluster 340-2 ("nebelung cats"), including vectors 332 that are proximal to vectors 335 in similar visual media file set 345. Accordingly, refined cluster 340-2 may be found by averaging all the distances from each vector 332 in cluster 340-2 to the closest vector 335 in set 345. Accordingly, a system as disclosed herein determines refined cluster 340-2 using an average distance D350 between points 332 and points 335, or a maximum distance D350 between points 332 and points 335. In some embodiments, the system may be configured to select refined cluster 340-2 from multiple clusters defined in multi-dimensional space 330 as the one cluster having the least average distance to vectors 335 in similar visual media file set 345. The system then selects the caption or keyword from refined cluster 340-2 as a refined caption (e.g., "nebelung cats"). Accordingly, the system may select a refined query as "nebelung cats," and present vectors 332 from refined cluster 340-2 in the results panel of a second search result, interleaved with at least some of the vectors 335a and 331 provided to (and at least some selected by) the user in the first search result.

In some embodiments, the system may find more than one refined cluster 340-2 that includes vectors 332 close to vectors 335. For example, the user may be interested in searching visual media files with more than one idea or concept simultaneously. In such embodiments the system may find two or more refined clusters 340-2, and select keywords and refined queries for each cluster. The system may display the different refined queries to the user. The user may select more than one refined query so that the system performs two or more visual media file searches simultaneously, thus improving the search quality.

Figure 4:
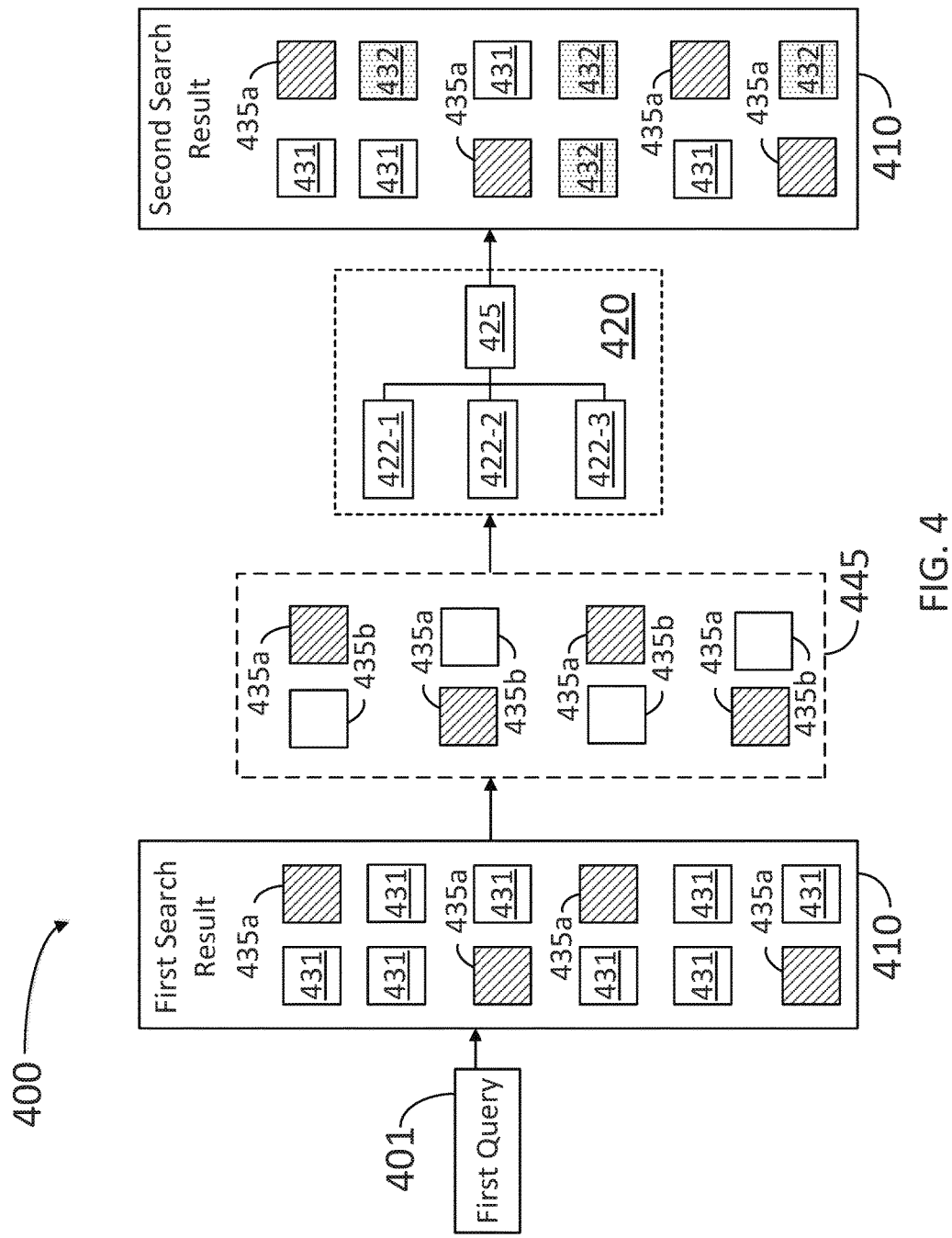
FIG. 4 is a walk-through illustration of an image search using a query refined with user image selection, according to some embodiments.

FIG. 4 is a walk-through illustration 400 of a search using a query refined with a user selection of a responsive visual media file, according to some embodiments. The user provides a first query 401. First query 401 may include one word (e.g., "cat"), or multiple terms (e.g., "cute cat"). More generally, first query 401 may include a salient "ngram" (a string having n-words) like "empire state building" or "mother's day," or even an entire sentence.

The system returns a set of first search results 431 in results panel 410, based on first query 401. Accordingly, search results 431 may be selected from cluster 340-1 in multi-dimensional space 330, wherein cluster 340-1 is defined or characterized by first query 401, or an overlapping caption or keyword. Based on first search results 431, the user may select responsive visual media files 435a (e.g., by clicking on, or downloading at least one of search results 431). The system forms a similar visual media file set 445 with visual media files 435a and visual media files 435b having a visual similarity with the responsive visual media files 435a (e.g., by looking at D350 between associated vectors in multi-dimensional space 330). In some embodiments, similar visual media file set 445 may not be displayed for the user.

Based on similar visual media file set 445, the system may obtain proposed queries 422-1 through 422-3 (hereinafter, collectively referred to as "proposed queries 422"), displayed in a proposed query panel 420. To obtain proposed queries 422, the system may detect one or more refined cluster 340-2 that is proximal to the images in similar visual media file set 445. Accordingly, proposed queries 422 may include one or more captions, keywords, or text descriptors from visual media files in the one or more refined clusters 340-2. In some embodiments, the system may display proposed queries 422 to the user. Accordingly, the user may select a refined query 425 from proposed queries 422 that best match the user's semantic intention when entering first query 401. In some embodiments, refined query 425 includes a combination of words and or segments selected from refined queries 422. In some embodiments, the system may detect only one refined cluster 340-2 and proposed query 422 is the same as refined query 425 (e.g., a caption, keyword, or text descriptor for refined cluster 340-2). Moreover, in some embodiments, refined query 425 includes some elements (e.g., words or characters) from proposed queries 422 and some elements added by the user (e.g., through input device 214). In some embodiments, the system may form refined query 425 automatically, without user input. Accordingly, whether refined query 425 is automatically selected or user-selected, the system may display refined query 425 to the user. In some embodiments refined query 425 may be obtained by selecting words based on a frequency of the words and other characters in the captions, keywords, or other textual descriptor of visual media files associated with refined cluster 340-2. In some embodiments, the system may not display refined query 425 to the user to avoid cluttering of the display in client device 110 or to protect user privacy.

The system displays a second search result for the user in results panel 410, interleaving at least some visual media files 431 from the first search result, at least some of responsive visual media files 435a, and at least some refined visual media files 432 from refined cluster 340-2. Presumably, the user will interact (e.g., click, download, and the like) with more of second search results 432 than first search results 431. Accordingly, the likelihood that the user will purchase any one, or even more than one, of second search results 432 is expected to be higher than for first search results 431.

Figure 5A:
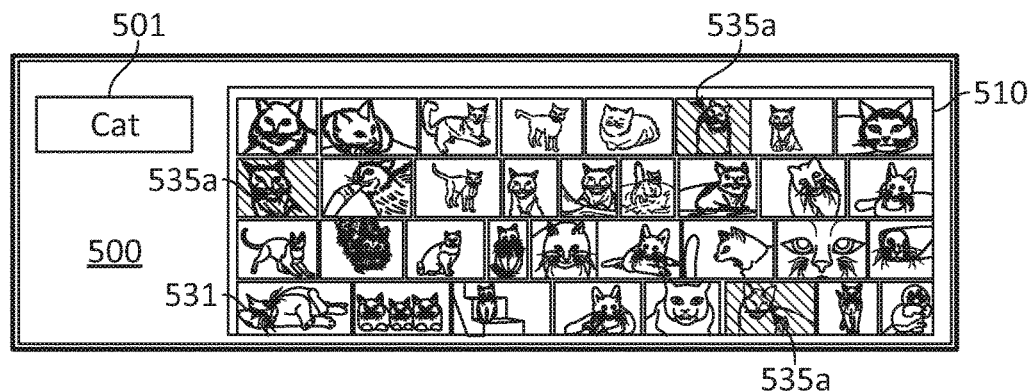
FIGS. 5A-5C illustrate screen shots of a web page configured for image search using a query refined with user image selection, according to some embodiments.
Figure 5B:
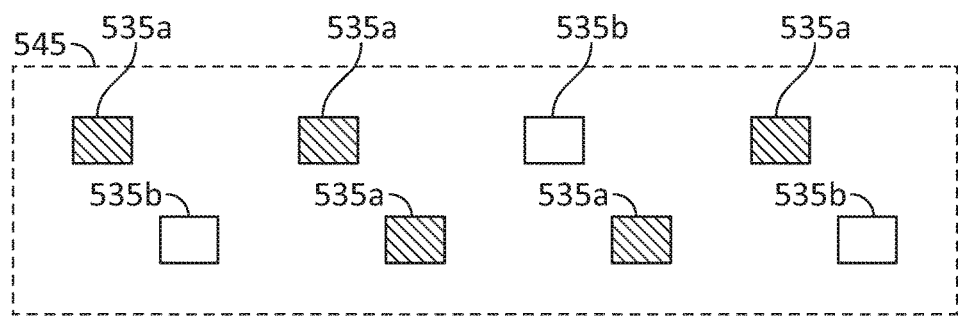
Figure 5C:
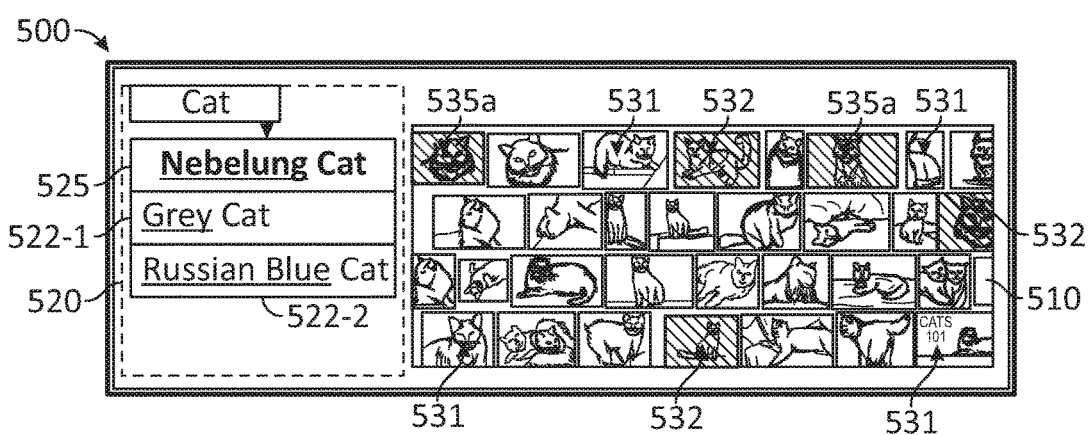

FIGS. 5A-C illustrate screen shots of a web page 500 configured for searching visual media files using a query refined with user selection of a responsive visual media file, according to some embodiments. A first query 501 for "cat" displays first results 531 in results panel 510. The user selects responsive visual media files 535a and the system identifies a similar visual media file set 545 (not necessarily displayed to the user), including responsive visual media files 535a and visual media files 535b that are similar to responsive visual media files 535a. Based on similar visual media file set 545, the system selects at least one or more refined clusters 340-2 that is proximal to similar visual media file set 545.

The system returns proposed queries 522-1 and 522-2 (hereinafter, collectively referred to as "proposed queries 522") displayed in a proposed query panel 520. Proposed queries 522 may be keywords, captions, or descriptor texts associated with the one or more refined clusters 340-2. In some embodiments, proposed queries 522 may be hidden from the user. Based on proposed queries 522, the system may obtain a refined query 525. Either after the user has accepted refined query 525, or automatically, the system displays refined search results 532 in results panel 510. Accordingly, the user may select, interact with, download, or purchase, refined search results 532. In some embodiments, the system may interleave refined search results 532 with at least some search results 531 and some of the responsive visual media files 535a.

In some embodiments it is expected that, even if the user selects only one refined result 532, the selection will be more satisfactory to the user. Therefore, the user will be more likely to interact, download, or purchase any one of refined results 532, compared to first results 531, or even responsive visual media files 535a. For example, the user may be expected to pay a higher premium for the purchase or downloading of any one of refined results 532. Moreover, an advertiser may be willing to pay a higher premium for placing an advertisement near results panel 510 for the second search result. Accordingly, web page 500 makes a user search experience faster and simpler, enticing the user to access the web site hosting web page 500 more frequently, and to download more visual media files, thereby increasing revenue and market visibility for the web site.

Figure 6:
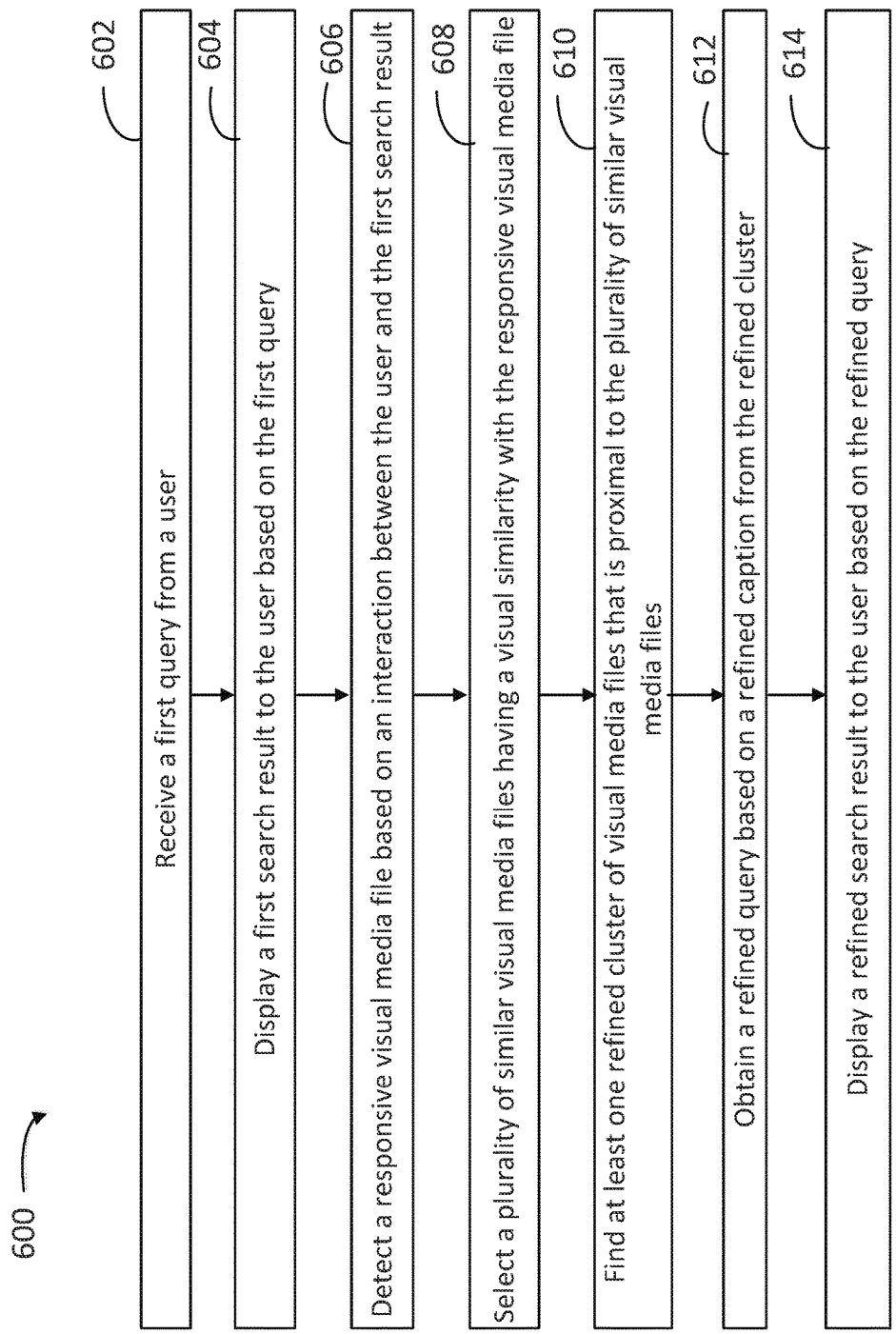
FIG. 6 illustrates a block diagram including steps in a method for refining a query to searching images, according to some embodiments.

FIG. 6 illustrates a block diagram including steps in a method 600 for refining a query to searching visual media files, according to some embodiments. Method 600 may be performed at least partially by any one of the network servers hosting a collection of visual media files (e.g., images, video clips, and multimedia files), while communicating with any one of a plurality of client devices (e.g., servers 130 and clients 110). At least some of the steps in method 600 may be performed by a computer having a processor executing commands stored in a memory of the computer (e.g., processors 212 and 236, memories 220 and 232). Further, steps as disclosed in method 600 may include retrieving, editing, and/or storing files in a database that is part of, or is communicably coupled to, the computer (e.g., training database 248, annotated training database 250, visual media database 252 and interaction history database 254). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes receiving a first query from a user.

Step 604 includes displaying a first search result to the user based on the first query. In some embodiments, step 604 includes displaying multiple visual media files from the first search result in a results panel displayed by the application on the client device display.

Step 606 includes detecting a responsive visual media file based on an interaction between the user and the first search result. In some embodiments, step 606 may include selecting one or more visual media files, and using similarity measures to search the database based on the one or more visual media files to obtain a refined visual media file set. In some embodiments, step 606 includes determining the type of interaction between the user and the responsive media file. For example, step 606 may include determining that the user has downloaded the responsive media file, or that the user has highlighted or light-boxed the responsive media file in the results panel, or that the user has clicked on an icon representing the responsive media file.

Step 608 includes selecting a plurality of similar visual media files having a visual similarity with the responsive visual media file. In some embodiments, step 608 may include obtaining a measure of visual similarity between the user-selected first search result and the search result from each of the proposed queries. Further, in some embodiments step 608 may include using a weighted probability for each of multiple responsive visual media files to select, with the search engine, a similar visual media file from the database. In some embodiments, step 608 may include adjusting the weighting factors according to the type of interaction between the user and the responsive media file. That is, step 608 may include adding a heavier weight to select visual media files that are similar to a responsive visual media file that the user has downloaded, compared to the weight for selecting a visual media file that is similar to a responsive media file that the user has only highlighted or light-boxed. Further, step 608 may include adding a lower weight to select a visual media file that the user has only clicked on. The weighted probability in step 608 may include a factor multiplying distance D350 between associated vectors in multi-dimensional space 330. For example, in some embodiments, step 608 may include multiplying D350 by a factor between '0' and '1' for selecting visual media files similar to a responsive visual media file that the user has downloaded. Likewise, step 608 may include multiplying D350 by a factor greater than '1' for selecting visual media files similar to a responsive visual media file that the user has only clicked-on once.

Step 610 includes finding at least one refined cluster of visual media files that is proximal to the plurality of similar visual media files. In some embodiments, step 610 may include selecting the multiple visual media files such that a cosine distance of each of the multiple visual media files to at least one of the similar visual media files (e.g., D 350) in a multi-dimensional vector space, is smaller than a selected threshold.

Step 612 includes obtaining a refined query based on a refined caption from the refined cluster. In some embodiments, step 612 may include selecting additional terms to add to the first query from the captions, query, and other text descriptors associated with the at least one responsive visual media file from the first result, or with at least one of the similar visual media files. In some embodiments, step 612 includes obtaining multiple proposed queries (e.g., proposed queries 422 or 522) from multiple refined clusters of visual media files. In some embodiments, step 612 may include selecting the refined query from one of the multiple proposed queries (e.g., the one proposed query that renders the largest number of search results, or 'hits' in the multi-dimensional space). In some embodiments, the refined query may include a combination of highly repeated terms, words, or characters in the caption, or keywords of the responsive visual media file from the first search result or from the refined cluster of visual media files. Accordingly, step 612 may include selecting the refined query from the proposed query that renders search results most similar to the user-selected first search results. In some embodiments, step 612 may include performing a weighted linear combination of the proposed queries, and selecting the refined query as the combination of all the proposed queries.

In some embodiments, step 612 includes displaying the refined query to the user. In some embodiments, step 612 includes displaying multiple proposed queries to the user, ordered based on metrics such as similarity, number of search results, or a weighted combination of the above. In some embodiments, step 612 includes allowing the user to modify the refined query into a second, modified query. In some embodiments, step 612 may include displaying more than one refined query for the user, wherein each of the refined queries is associated with a separate "concept" clustering a different set of visual media files in the multi-dimensional vector space for the database. In some embodiments, step 612 includes receiving the second query from the user. In some embodiments, step 612 may include receiving, from the user, two or more selected refined queries, to perform two or more different searches, simultaneously.

Step 614 includes displaying a refined search result to the user based on the refined query. In some embodiments, step 614 may include automatically displaying the refined search results to the user, without user input. In some embodiments, step 614 may include interleaving visual media files from the refined search result with visual media files from the first search result, for the user.

Figure 7:
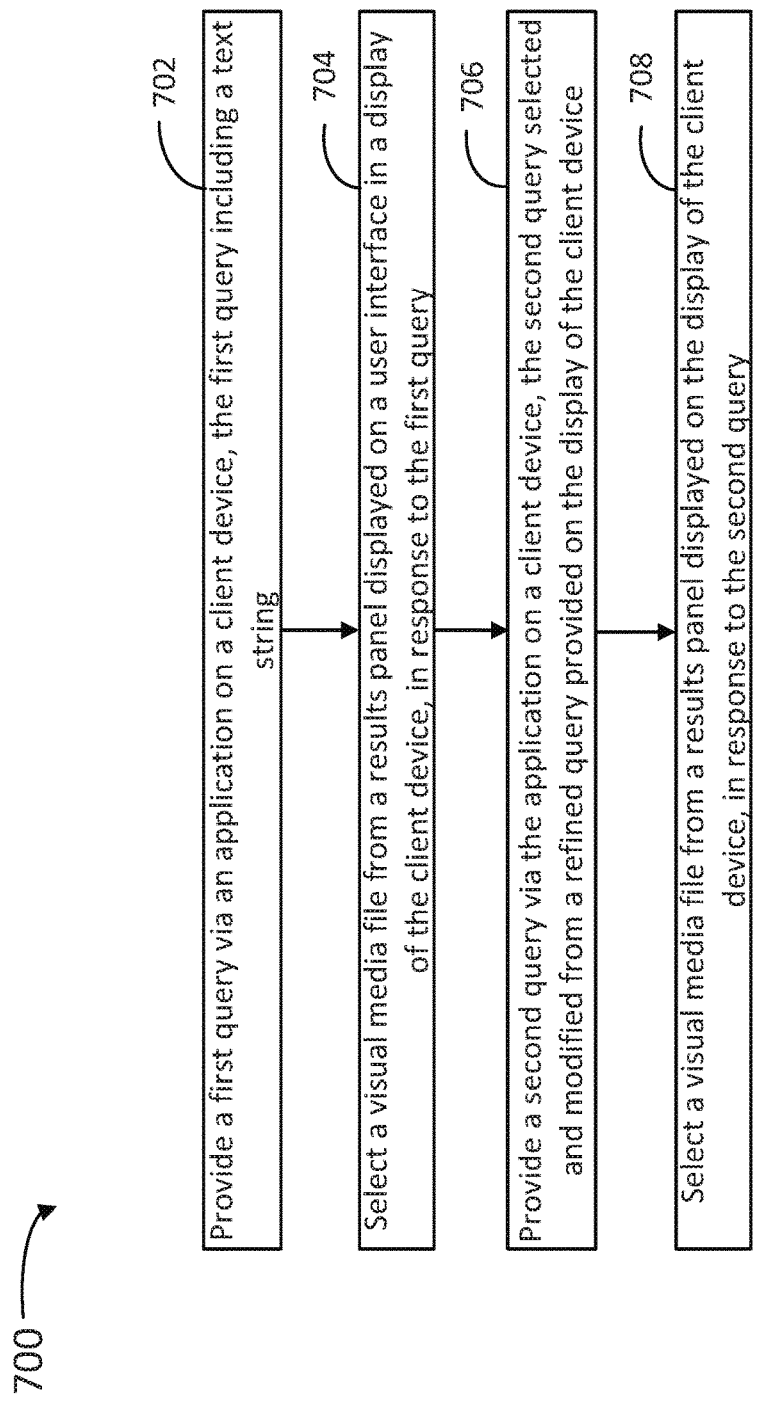
FIG. 7 illustrates a block diagram including steps in a method for searching images with a refined query, according to some embodiments.

FIG. 7 illustrates a block diagram including steps in a method 700 for searching images with a refined query, according to some embodiments. Method 700 may be performed at least partially by any one of the network servers hosting a collection of visual media files (e.g., images, video clips, and multimedia files), while communicating with any one of a plurality of client devices (e.g., servers 130 and clients 110). At least some of the steps in method 700 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer (e.g., training database 248, annotated training database 250, visual media database 252, and interaction history database 254). Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

Step 702 includes providing a first query via an application on a client device, the first query including a text string.

Step 704 includes selecting a visual media file from a results panel displayed on a user interface in a display of the client device, in response to the first query. In some embodiments, step 704 includes explicitly selecting multiple visual media files which are relevant to the user from a GUI in client device 110. In some embodiments, step 704 includes implicitly selecting at least one visual media file by interacting with the visual media file in some way. For example, the user may click on, or open, an image description link, or may add the image to a lightbox, and the like. In such configuration, server 130 may interpret the user interaction with the visual media file in the results panel as an implicit selection of the visual media file.

Step 706 includes providing a second query via the application on a client device, the second query selected and modified from a refined query provided on the display of the client device. In some embodiments, step 706 includes selecting the second query from multiple proposed queries that are based on a similarity between the visual media file from the results panel and a visual media file associated with at least one of the multiple proposed queries. In some embodiments, step 706 includes modifying a refined query displayed on the client device. In some embodiments, step 706 includes modifying the refined query with a high frequency word in multiple captions displayed on the client device. In some embodiments, step 706 includes modifying the refined query based on multiple proposed queries from a visual media file similar to the visual media file from the results panel.

Step 708 includes selecting a visual media file from a results panel displayed on the display of the client device, in response to the second query.

Hardware Overview

Figure 8:
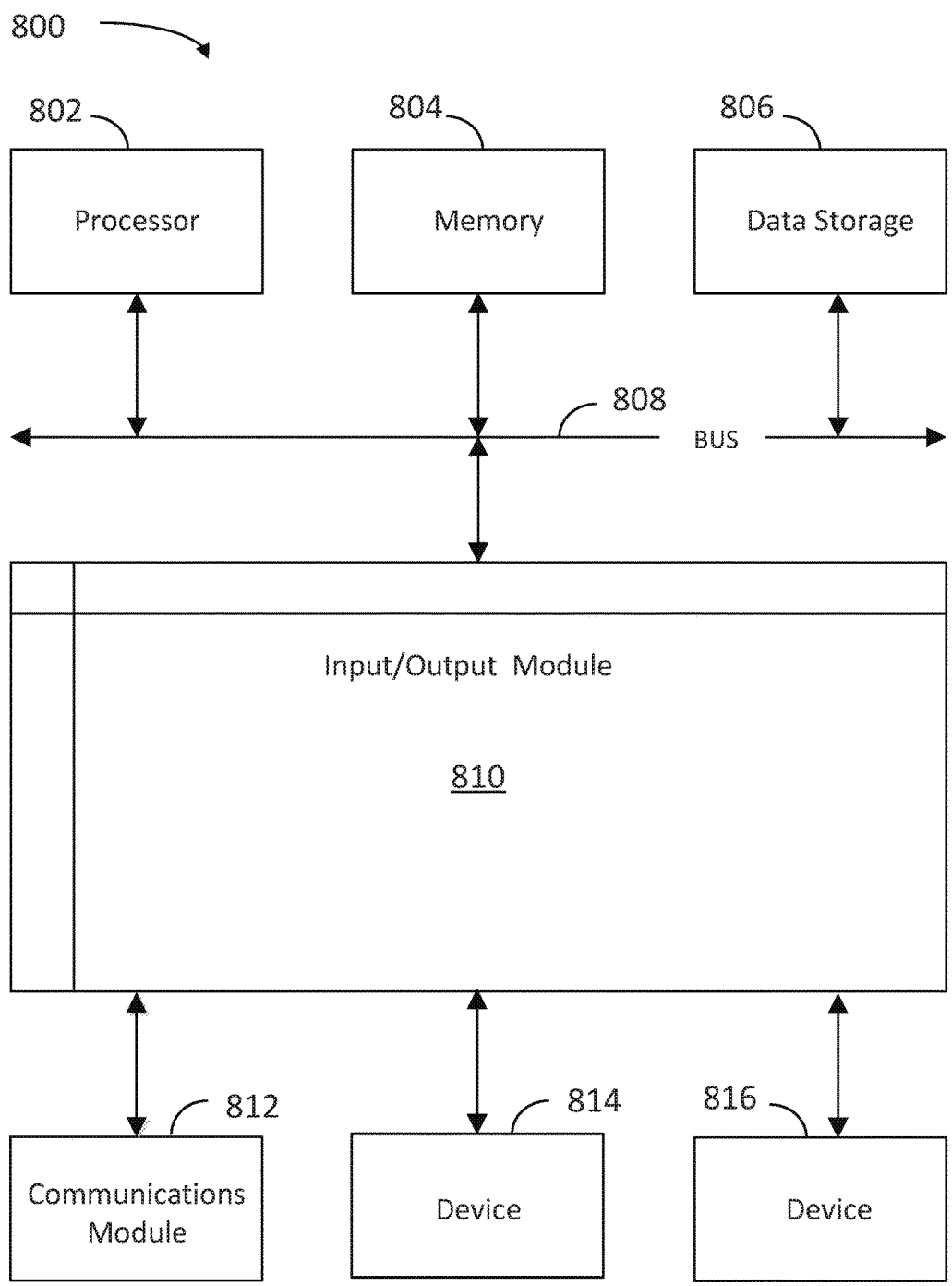
FIG. 8 is a block diagram illustrating an example computer system with which the client and server of FIG. 2 and the method of FIGS. 6 and 7 can be implemented.

FIG. 8 is a block diagram illustrating an exemplary computer system 800 with which the client 110 and server 130 of FIG. 1, and the method of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., any one of clients 110 and servers 130) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, the input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, any one of clients 110 and servers 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C, any combination of A, B, and C, and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

The invention claimed is:

1. A computer-implemented method, comprising:
receiving from a user a first search query for visual media files from a collection of visual media files;
providing, in response to the first search query, a first search result to the user, the first search result comprising responsive visual media files associated with the first search query;
detecting a user selection of a responsive visual media file based on an interaction between the user and the responsive visual media file;
selecting multiple similar visual media files having a visual similarity with the responsive visual media file, wherein the visual similarity comprises determining that a cosine distance of multiple visual media files to the responsive visual media file in a multi-dimensional space is smaller than a selected threshold;
generating a refined query based on a caption associated with a refined cluster of visual media files, the refined cluster of visual media files being proximal to one of the similar visual media files; and
displaying, to the user and based on the refined query, a refined search result comprising refined visual media files from the refined query.

2. The computer-implemented method of claim 1, wherein generating a refined query comprises generating multiple proposed queries to the user based on multiple captions from multiple refined clusters of visual media files that are proximal to the similar visual media file.

3. The computer-implemented method of claim 1, wherein generating a refined query comprises receiving the refined query from a user selection of multiple proposed queries selected from multiple captions in multiple refined clusters of visual media files that are proximal to the similar visual media file.

4. The computer-implemented method of claim 1, wherein generating a refined query comprises selecting the refined query from a highly repeated word in multiple captions of multiple visual media files selected from the refined cluster of visual media files.

5. The computer-implemented method of claim 1, wherein generating a refined query comprises selecting at least one word from a text descriptor of the refined cluster of visual media files.

6. The computer-implemented method of claim 1, wherein generating the refined query comprises selecting the refined query from multiple proposed queries according to a number of visual media files in the refined search result for each of the multiple proposed queries.

7. The computer-implemented method of claim 1, wherein generating the refined query comprises selecting the refined query from multiple proposed queries according to a similarity of a visual media file from a search result for each of the multiple proposed queries with the responsive visual media file.

8. The computer-implemented method of claim 1, further comprising displaying the refined query for the user, allowing the user to modify the refined query into a modified query, and displaying a modified search result to the user based on the modified query.

9. A system comprising:
one or more processors; and
a computer-readable storage medium coupled to the one or more processors, the computer-readable storage medium including instructions that, when executed by the one or more processors, cause the one or more processors to:
receive from a user a first search query for visual media files from a collection of visual media files;
provide, in response to the first search query, a first search result to the user, the first search result comprising responsive visual media files associated with the first search query;
detect a user selection of a responsive visual media file based on an interaction between the user and the responsive visual media file;
select multiple similar visual media files having a visual similarity with the responsive visual media file, wherein the visual similarity comprises to determine that a cosine distance of the visual media files to the responsive visual media file is smaller than a selected threshold in a multi-dimensional vector space;
generate a refined query based on a caption associated with a refined cluster of visual media files, the refined cluster of visual media files being proximal to one of the similar visual media files;
retrieve a caption for each of multiple visual media files from an annotated training database; and
display, to the user and based on the refined query, a refined search result comprising refined visual media files from the refined query.

10. The system of claim 9, wherein to generate a refined query the one or more processors is configured to generate multiple proposed queries to the user based on a similarity between the responsive visual media file and a visual media file associated with at least one of the multiple proposed queries.

11. The system of claim 9, wherein to generate a refined query the one or more processors is configured to receive the refined query from a user selection of multiple proposed queries selected from a plurality of visual media files similar to the responsive visual media file.

12. The system of claim 9, wherein to generate a refined query the one or more processors is configured to select the refined query from a highly repeated word in multiple captions of multiple visual media files selected from the refined cluster of visual media files.

13. The system of claim 9, wherein to generate a refined query the one or more processors is configured to:
receive the refined query from a user selection of multiple proposed queries selected from multiple captions in multiple refined clusters of visual media files that are proximal to the similar visual media file.

14. A computer-implemented method, comprising:
providing a first query via an application on a client device, the first query including a text string;
selecting a responsive visual media file from a results panel displayed on a user interface in a display of the client device, in response to the first query;
providing a second query via the application on a client device, the second query selected and modified from a refined query provided on the display of the client device, wherein the refined query is generated by a remote server based on a caption associated with a refined cluster of multiple visual media files, the visual media files being proximal to one of multiple similar visual media files according to a cosine distance of the visual media files to one of the similar visual media files in a multi-dimensional space being smaller than a selected threshold, and wherein the similar visual media files are selected n the remote server according to a visual similarity with the responsive visual media file; and
selecting a visual media file from a results panel displayed on the display of the client device in response to the second query.

15. The computer-implemented method of claim 14, wherein providing a second query comprises selecting the second query from multiple proposed queries in a refined cluster of visual media files, the refined cluster of visual media files selected based on a similarity between the visual media file from the results panel and a visual media file associated with the refined cluster of visual media files.

16. The computer-implemented method of claim 14, wherein providing a second query comprises modifying a refined query displayed on the client device.

17. The computer-implemented method of claim 14, wherein providing a second query comprises modifying the refined query with a high frequency word in multiple captions from multiple refined clusters of visual media files that are proximal to a similar visual media file that is similar to the responsive visual media file.

18. The computer-implemented method of claim 14, wherein generating a refined query comprises selecting at least one word from a text descriptor of a refined cluster of visual media files selected according to a similar visual media file that is similar to the responsive visual media file.

* * * * *